UNITED STATES PATENT OFFICE.

HERBERT W. C. KEMPTON DYSON, OF LONDON, ENGLAND.

METHOD OF MANUFACTURING RED AGGREGATES FOR USE AS ARTIFICIAL STONE, &c.

SPECIFICATION forming part of Letters Patent No. 716,689, dated December 23, 1902.

Application filed March 19, 1902. Serial No. 98,956. (No specimens.)

*To all whom it may concern:*

Be it known that I, HERBERT W. C. KEMPTON DYSON, a subject of the King of Great Britain, residing at Clapham Common, London, England, have invented new and useful Improvements in Methods of Manufacturing Red Aggregates for Use as Artificial Stone and for other Purposes, of which the following is a full and complete specification, such as will enable those skilled in the art to which it appertains to make and use the same.

This invention consists in the improvement in manufacturing red aggregates, grit, and the like for use in the manufacture of artificial-stone compositions of a rod color applicable also to cement and plaster and for use in the making of bricks, for decorating surfaces by making the aggregate adhere to these surfaces by means of paint, size, glue, varnish-cement, and the like, so as to produce a sandy or stony face, and for use in hour-glasses, toys, &c., and for use wherever fine ingredients or sand of a red color which cannot be affected by water, acids, lime, alkalies, weather, alcohol, &c., can be used, and in the manufacture thereof, as hereinafter described and claimed.

The ordinary method of making red artificial stone is to mix up with the sand aggregate and cement matrix powdered red oxid of iron—*i. e.*, ferric oxid, ($Fe_2O_3$.) The objections to this method are that (*a*) the free oxid of iron, being in the form of dust or powder, destroys in great part the setting quality of cements, with consequent weakening of their strength, all muddy particles which interfere with the binding crystalline formations to which the setting of cements is due acting in this way; (*b*) the cement alone retains the color for any length of time, the color around the grains of sand washing off with the rain or bleaching by the action of weather, the final result being that the whitish grains of sand are left appearing in a pink background; (*c*) the effect is not a good imitation of natural red stone; (*d*) to get the color sufficiently deep, the iron oxid has to be mixed with neat cement, which results in the surface being crazed all over with fine cracks. Vegetable dyes or colors have also been used; but they are quickly destroyed by the atmosphere, and lime will do so in a few minutes and are detrimental to the cement. The method I adopt of avoiding these defects is to impregnate and coat each grain of the sandy aggregate with red oxid of iron by chemical reaction, so that each grain is permanently of a red color, from which the color will not wash off of or out of and is not affected by lime, acids, alkalies, weather, alcohol, carbon compounds, &c. For this purpose I adopt the following method and means: The sandy aggregate is wetted with an aqueous solution of ferrous sulfate, ($FeSO_4$,) either by pouring the solution on the sand or by putting the sand into the solution and allowing it to decompose into insoluble brown basic ferric sulfate and oxyhydrates of iron in their amorphous condition by exposure to the air or by the action of a slight heat, or by allowing to stand for some time. If the sand is still moist with the solution of iron sulfate, I have found organic impurities increase the precipitation of these amorphous insoluble iron compounds. The mixture of sand and insoluble iron compounds is then heated strongly to a red heat—namely, between 350° and 3,000° centigrade—either in a damp state or dry, thus turning the iron compounds into red oxid of iron, which coats and impregnates each grain of sand. It is important that as much of the ferrous sulfate should have decomposed as it is possible to obtain or the sulfate when heated will become anhydrous and is then very hygroscopic, absorbing moisture from the air until of gummy consistency, sticking the grains of sand. This undecomposed sulfate is also highly detrimental to the setting of the cement used with the red aggregate in the manufacture of artificial stone. The method of burning or heating the aggregate is to put it in a furnace with good draft or current of air, and when red-hot it is discharged into the open to cool. The length of time it is necessary to heat the aggregate depends upon the temperature and is judged of by the degree of color the sand turns to.

The artificial stone is made by using the red aggregates exactly similarly to the ordinary method of making natural colored stones, granite, or stone clippings, burned ballast, &c., in the making of ordinary concretes and mortars by admixture with cements, limes, or plasters, whether they be Portland, Roman, magnesian, lime, silicic acid, or others. The sandy aggregate which I use for the purpose of turning it red by the methods mentioned above may be of any kind of sand, silicious, argillaceous, granitic, or otherwise, or it may be of any sharp granulated substance. The sanded decorative surfaces are made by drawing the designs in substances of an adhesive character—such as paints, sizes, gums, varnishes, glues, cements, plasters, &c.—and to dust or press the red aggregate upon or into them. The sand is also intended to be used for placing in transparent toys, hour-glasses, and the like. The red sandy aggregate can be used for admixture with the clay in the manufacture of red bricks, which by its use can be made of more brilliant and permanent colors throughout their substance.

Having fully described my invention, what I claim as new, and desire to secure by Letters Patent, is—

The method of making a red aggregate which consists in heating sand in which brown basic ferric sulfate and oxyhydrates of iron have been precipitated by the decomposition of sulfate of iron which has been added in the form of a solution to the sand, substantially as shown and described.

In testimony that I claim the foregoing as my invention I have signed my name, in presence of the subscribing witnesses, this 6th day of March, 1902.

HERBERT W. C. KEMPTON DYSON.

Witnesses:
 FRANCIS W. FRIGOUT,
 A. NUTTING.